US010351775B2

(12) United States Patent
Lorgouilloux et al.

(10) Patent No.: US 10,351,775 B2
(45) Date of Patent: Jul. 16, 2019

(54) MINERAL COMPOSITION MADE FROM A MIXED SOLID PHASE OF CALCIUM AND MAGNESIUM CARBONATES, METHOD OF PREPARING SAME AND USE THEREOF

(71) Applicant: S. A. Lhoist Recherche et Developpement, Ottignies-Louvain-la-Neuve (BE)

(72) Inventors: Marion Lorgouilloux, Strepy Bracquegnies (BE); Robert Sebastian Gartner, Buizingen (BE); Marc Pelletier, Saint-Mande (FR); Thierry Chopin, Uccle (BE)

(73) Assignee: S.A. Lhoist Recherche et Developpement, Ottignies-Louvain-la-Neuve (BE)

( * ) Notice: Subject to any disclaimer, the term of this patent is extended or adjusted under 35 U.S.C. 154(b) by 571 days.

(21) Appl. No.: 14/385,897

(22) PCT Filed: Mar. 22, 2013

(86) PCT No.: PCT/EP2013/056058
§ 371 (c)(1),
(2) Date: Sep. 17, 2014

(87) PCT Pub. No.: WO2013/139957
PCT Pub. Date: Sep. 26, 2013

(65) Prior Publication Data
US 2015/0044469 A1    Feb. 12, 2015

Related U.S. Application Data

(60) Provisional application No. 61/639,213, filed on Apr. 27, 2012, provisional application No. 61/691,868, filed on Aug. 22, 2012.

(30) Foreign Application Priority Data

Mar. 22, 2012   (BE) .................................. 2012/0199

(51) Int. Cl.
*C09K 21/02* (2006.01)
*C04B 28/10* (2006.01)
(Continued)

(52) U.S. Cl.
CPC ................ *C09K 21/02* (2013.01); *C01F 5/24* (2013.01); *C01F 11/18* (2013.01); *C01F 11/181* (2013.01);
(Continued)

(58) Field of Classification Search
None
See application file for complete search history.

(56) References Cited

U.S. PATENT DOCUMENTS 5,230,734 A * 7/1993 Kumasaka ............. C01F 11/18
106/464
5,979,461 A * 11/1999 Bensalem ................ A24D 1/02
131/365
(Continued)

FOREIGN PATENT DOCUMENTS

DE    3245103 A1    6/1984
EP    0526121 A1    7/1991
(Continued)

OTHER PUBLICATIONS

Written Opinion of the International Searching Authority; PCT/EP2013/056058, dated Mar. 22, 2013; 5 pages.
(Continued)

*Primary Examiner* — Ronak C Patel
(74) *Attorney, Agent, or Firm* — Whitaker Chalk Swindle & Schartz PLLC; Charles Gunter

(57) ABSTRACT

A mineral composition made from a mixed solid phase of calcium and magnesium carbonates, method of preparing same and use thereof. A mineral composition made from a mixed solid phase of calcium and magnesium carbonates,
(Continued)

formed from a crystallized calcium portion and a crystallized magnesium portion in the form of platelets, the crystals of the calcium portion and those of the magnesium portion being aggregated in the form of composite aggregates, said aggregates themselves being at least partially agglomerated, said calcium portion comprising at least one carbonate chosen from the group consisting of calcite, aragonite and the mixtures thereof, said magnesium portion comprising hydromagnesite in platelet form, said mixed solid phase having a bulk density less than or equal to 250 kg/m$^3$, and greater than or equal to 80 kg/m3, measured according to standard EN 459.2.

20 Claims, 10 Drawing Sheets

(51) Int. Cl.

| | | |
|---|---|---|
| *C04B 2/10* | (2006.01) | |
| *C04B 14/26* | (2006.01) | |
| *C04B 18/02* | (2006.01) | |
| *C01F 5/24* | (2006.01) | |
| *C01F 11/18* | (2006.01) | |
| *C04B 111/28* | (2006.01) | |

(52) U.S. Cl.
CPC ............... *C04B 2/10* (2013.01); *C04B 2/102* (2013.01); *C04B 14/26* (2013.01); *C04B 18/027* (2013.01); *C04B 28/10* (2013.01); *C04B 28/105* (2013.01); *C01P 2004/03* (2013.01); *C01P 2004/20* (2013.01); *C01P 2004/45* (2013.01); *C01P 2004/61* (2013.01); *C01P 2006/11* (2013.01); *C01P 2006/12* (2013.01); *C01P 2006/14* (2013.01); *C01P 2006/32* (2013.01); *C01P 2006/82* (2013.01); *C04B 2111/28* (2013.01); *Y10T 428/2982* (2015.01)

(56) References Cited

U.S. PATENT DOCUMENTS

| | | |
|---|---|---|
| 2008/0274034 A1 | 11/2008 | Sanchez-Valente et al. |
| 2010/0144521 A1 | 6/2010 | Constantz et al. |
| 2010/0239467 A1 | 9/2010 | Constantz et al. |
| 2012/0245253 A1* | 9/2012 | Schultz .................. C08K 3/26 523/435 |

FOREIGN PATENT DOCUMENTS

| | | |
|---|---|---|
| EP | 2322581 A1 | 5/2011 |
| GB | 506134 | 5/1939 |
| JP | 5285999 A | 7/1977 |
| JP | 63123810 | 5/1986 |
| JP | 63123810 | 5/1988 |
| JP | 05229819 | 9/1993 |
| WO | 2013139957 A1 | 9/2013 |

OTHER PUBLICATIONS

International Search Report, WO 2015/039994, dated Nov. 13, 2014, 3 pages.

* cited by examiner

US 10,351,775 B2

MINERAL COMPOSITION MADE FROM A MIXED SOLID PHASE OF CALCIUM AND MAGNESIUM CARBONATES, METHOD OF PREPARING SAME AND USE THEREOF

CROSS REFERENCE TO RELATED APPLICATIONS

The present application is the National Stage entry of PCT/EP2013/056058, international filing date of 22 Mar. 2013, entitled "Mineral Composition Made From A Mixed Solid Phase Of Calcium And Magnesium Carbonates, Method Of Preparing Same And Use Thereof," by Marion Lorgouilloux, Robert Sebastian Gartner, Marc Pelletier and Thierry Chopin, which claimed priority from a Belgian application, serial number 2012/0199, filed 22 Mar. 2012, from a U.S. provisional application, Ser. No. 61/639,213, filed 27 Apr. 2012, and from a U.S. provisional application, Ser. No. 61/691,868, filed 22 Aug. 2012, all with the same title and by the same inventors.

BACKGROUND OF THE INVENTION

1. Field of the Invention

The present invention relates to a mineral composition containing a mixed solid phase of calcium and magnesium carbonates, to a method for preparing the same and the use thereof.

2. Description of the Prior Art

Synthetic calcium carbonates are known, chiefly for uses as fillers (paper, paint, plastics). For these applications it is particularly known to synthesise dense carbonates, in particular calcite which is of scalenohedral, rhombohedral or prismatic morphology, or aragonite having acicular morphology.

Compositions are also known containing synthetic calcium and magnesium carbonates which are notably used in the field of paper and plastic material manufacture.

For example compositions according to patent applications EP-A-2322581 and DE-A-3245103 can be cited. The first discloses plate-like magnesium carbonate particles in the form of hydromagnesite in a mixture with colloidal calcium carbonate, well suited as fillers for paper or plastic materials. The second discloses scalenohedral calcium carbonate particles (i.e. in rice grain form) in a mixture with plate-like particles of basic magnesium carbonate. The respective carbonates are produced separately and do not form a composite.

The compositions described in European patent EP-B-0526121 are formed of a uniform mixture of calcium carbonate particles having a crystalline structure of acicular aragonite with columnar particle configuration and of hydrated magnesium carbonate having a plate-like particle configuration.

Japanese patent application JP 63-123810 is also known which describes a method for producing a mineral composition containing a mixed solid phase of calcium and magnesium carbonates. This method comprises carbonation of an aqueous suspension of basic magnesium carbonate to which is continuously added an aqueous suspension of magnesium hydroxide and calcium hydroxide. Carbonation is conducted with high $CO_2$ flow rate which gives rise to the formation of spherical, porous particles of basic magnesium carbonate on the germination nuclei of the basic magnesium carbonate initially present in suspension, the pores of these particles being partly filled with calcium carbonate. This composition is highly dense and intended for the production of fillers in the field of paper, paint, plastic material manufacture or for the medical sector.

SUMMARY OF THE INVENTION

The present invention aims at developing mineral compositions particularly intended for the building sector. In this field there is a need for example to develop mineral compositions able to offer an advantageous alternative to polyurethane or phenolic foams usually used in thermal insulation panels for example. Indeed, mineral materials have the advantage compared with organic foams of having a longer lifetime, much better fire resistance and reduced environmental impact. It is hence desirable that these new mineral compositions have thermal properties that are substantially comparable to those of known foams. There is therefore a need to develop mineral materials having high, controlled volume porosity and of low density, while maintaining acceptable mechanical properties (resistance to bending, compression, impacts . . . ).

In a porous medium by thermal conductivity is meant a value $\lambda$ which is the sum of i) the ratio of the thermal conductivity of the gas occluded in the pores to the volume fraction of the pores in the composition and ii) the ratio of the thermal conductivity of the solid matter to the volume fraction of this solid matter in the composition. The thermal conductivity of gases is generally in the order of $10^{-2}$ W/K/m and for solids it is in the order of 1 to $10^2$ W/K/m; the larger the volume fraction of gas (hence of pores) in the composition, the lower the thermal conductivity of the composition and the better the insulating property of the material.

To solve this problem, there is provided according to the present invention a mineral composition containing a mixed solid phase of synthetic calcium and magnesium carbonates, formed of a crystallised calcic portion and of a crystallised magnesium portion in plate-like form, the crystals of the calcic portion and those of the magnesium portion forming composite aggregates, these aggregates themselves being at least partially agglomerated in the form of agglomerates, the said calcic portion comprising at least one carbonate selected from the group consisting of calcite, aragonite and the mixtures thereof, the said magnesium portion comprising hydromagnesite in plate-like form, the said mixed solid phase having a bulk density equal to or less than 250 kg/m$^2$ and equal to or greater than 80 kg/m$^3$ measured according to standard EN 459.2.

DETAILED DESCRIPTION OF THE INVENTION

Figure 1A:
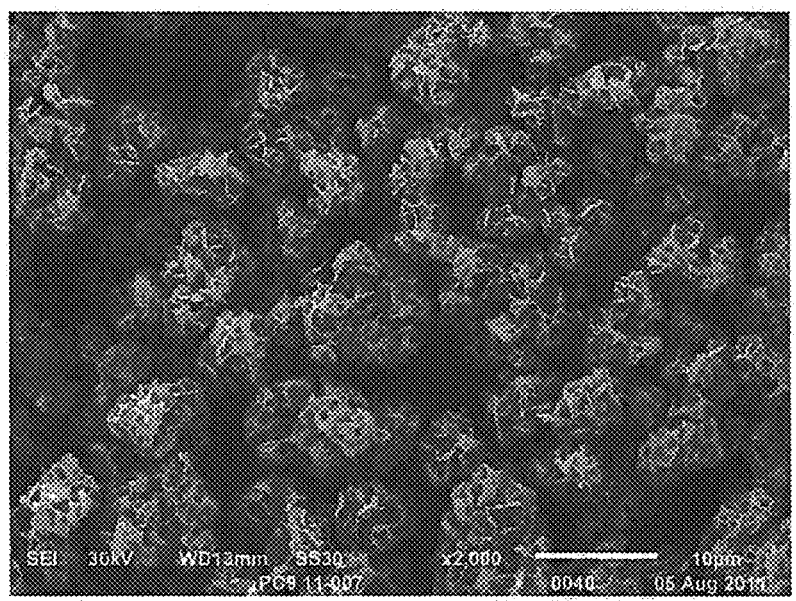
FIGS. 1A-10B illustrate the crystalline structure of the compositions obtained in the Examples contained in the detailed description of the invention, the Figures having the same numbering as the examples with two different magnifications 2000× (Figures A) and 10 000× (figures B) under scanning electron microscopy.

Calcite and aragonite are two crystalline structures of calcium carbonate $CaCO_3$. Hydromagnesite, also called basic magnesium carbonate has the formula $Mg_5(CO_3)_4(OH)_2.4H_2O$ or $4MgCO_3.Mg(OH)_2.4H_2O$. In the International Centre for Diffraction Data database (ICDD), hydromagnesite corresponds to the datasheets carrying references 00-025-0513 (monoclinic) and 01-070-1177 (orthorhombic). It must not be confuse with magnesite, a magnesium carbonate of formula $MgCO_3$, or with nesquehonite, a hydrated magnesium carbonate of formula $MgCO_3.3H_2O$, which are to be avoided according to the invention.

By «aggregates» in the present invention is meant a cohesive assembly of crystals.

By «agglomerates» in the present invention is meant a loose assembly of crystal aggregates and/or of crystals which can easily be broken up using mechanical means (ultrasound, agitation, shear, vibration . . . ).

By «bulk density» in the present invention is meant the ratio between the mass of the material and the apparent volume of all the agglomerates or grains measured in accordance with standard EN 459.2.

The low bulk density of the mixed solid phase of the composition according to the invention results from a large porous volume i.e. a high incorporation of gas in the mixed solid phase which has several porosity levels: within the crystal aggregates, within the agglomerates of aggregates and even between the agglomerates or grains.

By «porous volume» in the present invention is meant a global porous volume corresponding to the different porosities described above and measured using the mercury intrusion method. In the remainder hereof it is considered that the porous volume corresponds to the volume of pores having a pore size of <100 µm.

It is generally recognised that the bulk density of standard hydromagnesite is between 200 and 400 kg/m³. Synthetic calcium carbonates usually have a bulk density of between 250 and 600 kg/m³.

Against all expectations, the mixed solid phase of calcium carbonate and hydromagnesite of the composition according to the invention has a bulk density lower than 250 kg/m³.

This result is all the more surprising since it allows reduced thermal conductivity values to be reached for the mixed solid phase of the mineral composition according to the invention, in the order of 25 to 45 mW/K/m and in particular in the order of 28 to 45 mW/K/m.

The mixed solid phase of the composition of the invention therefore has particular aspects which are not found in usual pure phases of hydromagnesite or synthetic calcium carbonate type.

The explanation could be found in the fact that the mixed solid phase of calcium and magnesium has a mixed crystallisation structure allowing a better compromise between porosity, extent of aggregation and organisation of the crystals relative to one another. This compromise leads to a low bulk density and therefore to low thermal conductivity. This effect among others is obtained with the method of the invention which is specially designed to reach the particular characteristics of low bulk density and hence of low thermal conductivity of the solid phase of the composition according to the invention. This method is described in more detail below and comprises a carbonation step of a mixed calcium and magnesium hydroxide which allows the forming of a mixed solid phase of calcium and magnesium carbonates whose structure is controlled.

In one embodiment of the invention, the said magnesium portion of the mineral composition according to the present invention may further contain periclase MgO and/or brucite $Mg(OH)_2$. The proportions of these different components in the mixed solid phase of the composition of the invention, in addition to the synthetic calcium carbonates and hydromagnesite, are related to the operating conditions and properties of the hydrated dolomite used for the carbonation method allowing the obtaining of the mixed solid phase of the composition according to the invention described below.

Fully hydrated dolomite (hydrated under pressure to prevent the residual presence of MgO in the hydrated dolomite) will lead to higher contents of $Mg(OH)_2$ in the mixed solid phase of the composition according to the invention than if a partially hydrated dolomite is used, the latter possibly leading to the presence of MgO in the mixed solid phase of the composition according to the invention.

In another embodiment of the invention, the calcic portion of the composition of the invention may further contain calcium hydroxide $Ca(OH)_2$, e.g. in portlandite form. It is to be noted that the calcic portion always has a majority weight proportion of calcite, aragonite or a mixture of both.

In one advantageous embodiment of the present invention, the mixed solid phase of the said mineral composition has a specific surface area of 15 m²/g or larger, more particularly larger than 20 m²/g and preferably 25 m²/g or larger, possibly reaching 35 m²/g.

By «specific surface area» used in the present invention is meant the specific surface area measured by manometric nitrogen adsorption and calculated using the Brunauer, Emmett and Teller model (BET method) after degassing at 190° C.

The mixed solid phase of the composition of the invention therefore has a further unexpected advantage in that its specific surface area is larger than that of usual synthetic calcium carbonates which have a specific surface area in the order of 4 to 15 m²/g.

Advantageously the composition of the present invention may further contain an aqueous phase, the said composition then being in suspension or paste form. It may also be in solid form, particularly in powder form, and have a humidity content of between 0 and 4 weight %, in particular between 0.1 and 4%, preferably of 3% or lower, more preferably of 2% or lower by weight of water relative to the total weight of the composition. In one particular suspension embodiment, the agglomerates may be dispersed.

According to one embodiment of the invention, the said hydromagnesite is represented by the formula $Mg_5(CO_3)_4(OH)_2.4H_2O$ (or indifferently $4MgCO_3.Mg(OH)_2.4H_2O$) and is present in a content of between 10 and 60% by weight, preferably 20% by weight or higher, more preferably 30% by weight or higher relative to the weight of the said mixed solid phase.

Advantageously the said calcic portion is contained in the composition of the invention in an amount ranging from 35 to 75%, advantageously 40 to 70%, preferably 45 to 65%, more preferably 50 to 60% by weight relative to the total weight of the mixed solid phase. The total magnesium portion represents an amount ranging from 25 to 65%, advantageously 30 to 60%, preferably 35 to 55% and more preferably 40 to 50% of the total weight of the mixed solid phase.

In a dry powder of a preferred composition of the invention, the following compounds can be found (in weight %):
calcite $CaCO_3$: 26-6%;
aragonite $CaCO_3$: 0-25%;
portlandite $Ca(OH)_2$: 0-2%;
hydromagnesite $Mg_5(CO_3)_4(OH)_2:4H_2O$: 13-54%;
brucite $Mg(OH)_2$: 0-44%, preferably 0-25%;
periclase MgO: 0-5%;
magnesium oxyhydroxide $Mg_5O_2(OH)_2$: 0-5%;
with a total of 36 to 67% of $CaCO_3$ and a total of 28 to 64% for the magnesium portion.

According to the invention the mixed solid phase has a Ca/Mg molar ratio of between 0.4 and 1.2, and in particular it is between 0.8 and 1.2.

The composition of the invention is either in powder form or in the form of a suspension or paste from which a said powder can be produced.

Preferably, in the mineral composition of the invention the bulk density of the mixed solid phase is 200 kg/m$^3$ or lower, more particularly 180 kg/m$^3$ or lower, even 160 kg/m$^3$ or lower. Advantageously the bulk density is equal to or higher than 90 kg/m$^3$, in particular equal to or higher than 100 kg/m$^3$.

In one advantageous embodiment of the present invention the mixed solid phase of the said mineral composition has a thermal conductivity of between 25 and 45 mW/K/m, in particular between 28 and 45 mW/K/m. This conductivity is preferably equal to 40 mW/K/m or lower, more particularly equal to 35 mW/K/m or lower and preferably it is equal to 32 mW/K/m or lower.

According to one advantageous embodiment of the invention, the mixed solid phase is contained in a proportion ranging from 5 to 65% by weight relative to the total weight of the composition, and a liquid medium is present in a proportion ranging from 35 to 95% by weight relative to the total weight of the mineral composition.

According to one particular embodiment of the invention, the said mixed solid phase is composed of agglomerates ground into grains of 2 mm size or smaller, preferably 1 mm or smaller, more preferably 200 μm or smaller and further preferably 80 μm or smaller.

According to one improved embodiment of the invention, the aggregates of the mixed solid phase are formed of a calcic core on which plates of hydromagnesite are aggregated.

In another particular embodiment of the invention, the aggregates have a substantially spherical morphology.

According to one embodiment of the invention, 80% by volume of the aggregates have a characteristic size in the order of 1 to 40 μm, preferably 3 to 30 μm, more preferably 5 to 20 μm on the basis of SEM photos. 80% by volume of the hydromagnesite plates have a width in the order of 0.5 to 10 μm, preferably 0.5 to 5 μm.

The hydromagnesite plates are not randomly aggregated. Most often the aggregates of the invention have a general shape similar to that of a gypsum flower.

A dry powder of a preferred mineral composition of the invention may have the following characteristics:
bulk density: 80-250 kg/m$^3$
thermal conductivity: 25-45 mW/K/m
specific surface area, BET: 15-35 m$^2$/g
<100 μm pore volume; 1-5 cm$^3$/g
humidity: 0-4%.

The present invention also concerns a method for manufacturing a mineral composition containing a mixed solid phase of calcium and magnesium carbonates, comprising:
i) preparing at least partially hydrated dolomite by calcining raw dolomite followed by at least partial hydration of the calcined dolomite;
ii) placing the said at least partially hydrated dolomite in suspension in an aqueous phase, this suspension having a proportion of between 5 and 15% by weight of solid matter relative to the total weight of the suspension;
iii) performing carbonation of the said dolomite in suspension by injecting a $CO_2$-containing gas into the said suspension heated to a temperature of 55 to 90° C. at a $CO_2$ flow rate of 2.5 to 15 dm$^3$/min/kg of said solid matter in suspension, with a stepwise reduction in the pH of the suspension down to a value of less than 9 and in parallel and successively with a reduction in the electrical conductivity of the suspension, followed by stabilization thereof and finally an increase in the stabilized electrical conductivity, carbonation being halted as soon as this increase in electrical conductivity is observed.
iv) obtaining a mixed solid phase of synthetic calcium and magnesium carbonates formed of a crystallised calcic portion and a crystallised magnesium portion in plate-like form, the crystals of the calcic portion and those of the magnesium portion being aggregated in the form of composite aggregates, these aggregates themselves being at least partly agglomerated in the form of agglomerates, the said calcic portion comprising at least one carbonate selected from the group consisting of calcite, aragonite and the mixtures thereof, the said magnesium portion comprising hydromagnesite in plate-like form, the said mixed solid phase of carbonates of the said mineral composition having a bulk density equal to or lower than 250 kg/m$^3$ and equal to or higher than 80 kg/m$^3$ measured in accordance with standard EN 459.2.

In the meaning of the present invention by stabilization of electrical conductivity is meant a period of more than 15 minutes during which the electrical conductivity measured in the suspension does not vary by more than 0.5 mS/cm upwards or downwards, preferably a period of more than 15 minutes during which the variation in conductivity is less than 0.3 mS/cm upwards or downwards, and advantageously a period of 30 minutes during which the variation in electrical conductivity is less than 0.3 S/cm upwards or downwards. Depending on operating conditions, this stabilization phase may be of greater or lesser length. In some variants of the method it may last 60 minutes or even more.

According to one particular embodiment of the invention the raw dolomite, before calcining, is contained in a dolomitic mineral product in association with one or more calcic substances, one or more magnesium substances or a mixture of these substances, forming a Ca/Mg molar ratio of between 0.8 and 1.2 in the dolomitic mineral product, and the solid matter of the suspension obtained after the steps of calcining, hydrating and placing in suspension, in addition to the at least partially hydrated dolomite particles, also contains particles related thereto derived from the associated substances in the dolomitic mineral product.

Various dolomitic products can be found in nature and may in particular, in addition to raw dolomite, contain for example calcium carbonate, brucite, . . . . It is also to be noted that natural raw dolomite which is generally given the formula $Ca.Mg(CO_3)_2$ may have varying respective quantities of Ca and Mg.

Therefore in the meaning of the present invention, by raw dolomite is not only meant dolomite of formula $Ca.Mg(CO_3)_2$ but also a mixed carbonate of calcium and magnesium of natural origin having the general formula $aCaCO_3.bMgCO_3$, a and b being molar coefficients such that a/b=0.8 to 1.2.

Therefore the said at least partially hydrated dolomite has the general formula $aCa(OH)_2.xMg(OH)_2.yMgO$ wherein a, x and y are molar coefficients in particular with $0.8 \leq a/(x+y) \leq 1.2$ where x+y=b. It is advantageously a semi-hydrated dolomite in which the weight proportion of residual MgO is 1% by weight or higher, advantageously higher than 10% and preferably than 20% and which is obtained by conventional calcining and hydration of raw dolomite. The use of said semi-hydrated dolomite allows a mineral composition to be produced wherein the mixed solid phase comprises hydromagnesite and calcite and/or aragonite, the contents of brucite, periclase and portlandite being low (each being less than 10%, advantageously less than 5% and preferably less than 2% by weight of the mixed solid phase). In one variant of the present invention, the said at least partially hydrated dolomite is a so-called fully hydrated dolomite in which the weight proportion of residual MgO is less than 1% by weight and is obtained by calcining and hydrating raw dolomite under pressure. The use of said fully hydrated dolomite allows a mineral composition to be produced whose mixed solid phase comprises hydromagnesite and calcite and/or aragonite but also a non-negligible amount of brucite (up to 40% by weight of the mixed solid phase in some cases), the periclase and portlandite contents remaining low however (each being less than 5% preferably less than 2% by weight of the mixed solid phase).

In another variant of the method of the invention, to increase the proportion of magnesium in the final composite, a predetermined quantity of $Mg(OH)_2$ is added, before carbonation, to the at least partially hydrated dolomite which may or may not be in suspension, so as to obtain a mixed solid phase having a Ca/Mg molar ratio of between 0.4 and 1.2. It can also similarly be envisaged to add an amount of MgO of between 1 and 5% by weight relative to the weight of the fully hydrated dolomite in order in particular to reinforce the spherical morphology of the aggregates.

It is to be noted that the starting at least partially hydrated dolomite may contain a certain fraction of $CaCO_3$, an indication of incomplete calcining, and of CaO due to incomplete slaking (hydration) as well as impurities.

At least partial hydration of dolomite can be performed via dry process by adding to one mass unit of calcined dolomite a quantity of aqueous phase (generally water, optionally milk of lime and/or of dolomite, or water with additives) in an amount of between 0.2 and 1.0 mass unit, preferably 0.4 to 0.8 mass unit. In this case, the hydration product obtained [at step i)] is a powder having less than 30% relative humidity.

This at least partial hydration may also be performed via wet process by adding to one mass unit of calcined dolomite a quantity of aqueous phase, water in particular, having a mass unit of between 1.1 and 6 and preferably between 2 and 5, more particularly 4 mass units. With this wet hydration process, one variant of the method of the invention uses a single step to hydrate the calcined dolomite, having for example a Ca/Mg molar ratio of between 0.8 and 1.2 by calcining raw dolomite, and to place the said at least partially hydrated dolomite in said suspension in an aqueous phase by slaking the said calcined dolomite with sufficient excess water to obtain the said suspension directly.

Advantageously, when placing the at least partially hydrated dolomite in suspension it is possible to provide for a proportion of 7 to 10% by weight of solid matter relative to the total weight of the suspension.

In one variant of the method of the invention, step i) or the said calcining of raw dolomite at step i), or step i) and step ii) are performed previously and independently of the following steps, in particular steps iii) and iv).

After the placing in suspension corresponding to step ii), the method may further comprise the sieving, in particular to a particle size of 250 µm or less, or grinding in particular to a particle size of 90 µm or less, of the said at least partially hydrated dolomite in suspension in an aqueous phase, to which are optionally added MgO and/or $Mg(OH)_2$ before carbonation. Dilution of the suspension may also be carried out.

The composition of the invention may further comprise additives to facilitate the preparation, filtering, storage and/or grinding (de-agglomeration) of the said composition, in particular to improve the stability of the suspensions of the invention.

Carbonation of the dolomite in suspension is advantageously conducted at a temperature between 60 and 80° C., preferably at 70° C. or lower, in particular at 65° C. or lower.

During this step, provision is preferably made for the $CO_2$ to be injected pure at 100% by volume or diluted in a carrier gas, air in particular, at a volume concentration of $CO_2$ in the carrier gas of 15 to 50%, in particular 15 to 25%. The total injection rate (optional carrier gas and $CO_2$) may advantageously be in the order of 15 to 55 $dm^3$/min/kg of solid matter in suspension. The $CO_2$ flow rate (excluding carrier gas) is advantageously between 2.5 and 9.5 $dm^3$/min/kg of solid matter in suspension.

The increase in electrical conductivity in the carbonated suspension, after the stabilization period, indicates the formation of soluble magnesium bicarbonate $MgHCO_3$ and the onset of undesired dissolution of the hydromagnesite. Carbonation is then halted. In general the pH is observed to be 8.5 or lower.

During the placing in suspension and carbonation, the suspension of dolomite may advantageously be held under agitation e.g. at a rate of 350 to 650 rpm.

According to one embodiment of the invention, the method further comprises a solid-liquid separation step between the said carbonated mixed solid phase and the said aqueous phase.

This separated mixed solid phase can then be dried. Advantageously the mixed solid phase can be ground or de-agglomerated to obtain particles of size of 2 mm or less, preferably of 1 mm or less, more preferably of 200 µm or less and further preferably of 80 µm or less. The drying operation can be performed simultaneously with de-agglomeration or grinding.

According to one embodiment of the invention, the method further comprises drawing off a predetermined quantity of suspension after carbonation, feeding a fresh suspension of non-carbonated semi-hydrated dolomite and subsequent carbonation.

The present invention also concerns the use of a mineral composition according to the invention or such as obtained using the method of the invention in building materials.

In particular this composition can be envisaged as a constituent of thermal insulation materials, in particular of thermal insulation panels.

Other details and particular aspects of the invention will become apparent from the description given below of non-limiting examples, in which the percentages given are weight percentages when not specified.

The appended Figures illustrate the crystalline structure of the compositions obtained in the Examples. The Figures have the same numbering as the examples with two different magnifications 2000× (Figures A) and 10 000× (Figures B) under scanning electron microscopy (SEM).

In the examples the bulk density is measured in accordance with standard EN 459.2. When measuring thermal conductivity, which is dependent on the extent of compacting of the sample, a non-normalised second density value is given which it is essential to indicate in order to determine the conditions of thermal conductivity measurement.

Thermal conductivity is measured on a bulk material following the teachings of standards ISO 8301 and NF EN 12664. More specifically thermal conductivity such as mentioned in the present invention is measured on the mixed solid phase of the mineral composition of the present invention i.e. on a powder previously dried at 105° C. and having a moisture content of less than 4% by weight. If the composition of the invention is in the form of a suspension or paste, the said powder is obtained from this composition following the steps described above in the present invention or described in the examples.

Measurement is performed in a flow meter (Netzsch Heat Flow Meter HFM 463/3/IB Lambda Series) on a bulk powder placed in a mould of larger size than the size of the flow meter. The preparation of the powder bed in the mould is such that the surface of the powder bed is as flat as possible, and the density of the powder bed on which thermal conductivity will be measured is equal to the bulk density previously measured on each powder according to the method described in standard EN 459.2 to within 20% if possible to within 15%. A single measurement is taken with a temperature difference of 20° C. between the two sides of the sample (i.e. 0° C. for one side and 30° C. for the other).

The specific surface area is measured using the BET method by manometric nitrogen adsorption after degassing the sample at 190° C., and the <100 μm pore volume is measured by mercury intrusion.

Example 1: Carbonation of Semi-Hydrated Dolomite (4% Mg(OH)$_2$, 28% MgO) at 70° C.

A/ Raw Material

The semi-hydrated dolomite used in this example was prepared industrially from natural dolomite by calcining followed by slaking in a conventional industrial hydrator with low excess water (hydration via dry process). According to thermogravimetric analysis supplemented by chemical analysis using X fluorescence spectrometry, this semi-hydrated dolomite contained 45%±0.5% Ca(OH)$_2$, 4%±0.5% Mg(OH)$_2$ and 28%±0.5% MgO. It also contained 15%±0.5% residual CaCO$_3$, calcination of the dolomite being incomplete, 5%±0.5% residual CaO, hydration of the dolomite being incomplete, and impurities particularly expressed in the form of SiO$_2$, Al$_2$O$_3$, Fe$_2$O$_3$ .... The Ca/Mg molar ratio of this dolomite was 1.1.

B/ Preparation of the Milk

Milk of dolomite (aqueous suspension of particles of semi-hydrated dolomite) was prepared by mixing 10 dm$^3$ of demineralized water at 20° C. with 1100 g±15 g of semi-hydrated dolomite (i.e. a dry matter content of about 10%). This milk was left under agitation for 10 minutes before 250 μm sieving. The milk passing through the sieve was added to a reactor of 12 dm$^3$ capacity equipped with a double jacket and provided with an agitation system and heating system. This reactor was also fitted with a pH probe, an electrical conductivity probe and a temperature probe. Particles retained by sieving (>250 μm) were considered as reaction waste. The milk was held under agitation and the temperature brought to 70° C.±2° C.

C/ Carbonation

When the milk reached the temperature of 70° C.±2° C., the injection of CO$_2$ in the form of a gas composed of 15% by volume CO$_2$ and 85% by volume of air was initiated. The CO$_2$ carrier gas was injected through a nozzle at the bottom of the reactor. The gas flow rates in the suspension were 3.4 dm$^3$/min for CO$_2$ and 19.6 dm$^3$/min for air per kg of starting semi-hydrated dolomite. Throughout entire carbonation the electrical conductivity of the milk and its pH were recorded. The pH of the milk before carbonation was 12.3. During carbonation the conversion of the hydroxides to carbonates was accompanied a) by a step reduction in pH and b) by a reduction, by a stabilized phase and finally by an increase in electrical conductivity. The reaction was halted when electrical conductivity started to increase, this increase occurring simultaneously with a drop in pH down to below 9 and in this case to 8.6. The electrical conductivity at the start of carbonation was 9.9 mS/cm, during the stabilized phase it was 1.0-1.3 mS/cm and the reaction was halted when electrical conductivity reached 2.8 mS/cm.

The increase in electrical conductivity at around a pH of 8.6 (pH between 7.5 and 9) indicates formation of soluble magnesium bicarbonate and the onset of undesired dissolving of the hydromagnesite.

D/ Post-Synthesis Treatments

After carbonation, the suspension was filtered through Büchner apparatus, placed in a drying oven at 105° C. overnight and the dried solid was ground to obtain a powder of particle size of less than 2 mm and humidity content of less than 3%.

Figure 1B:
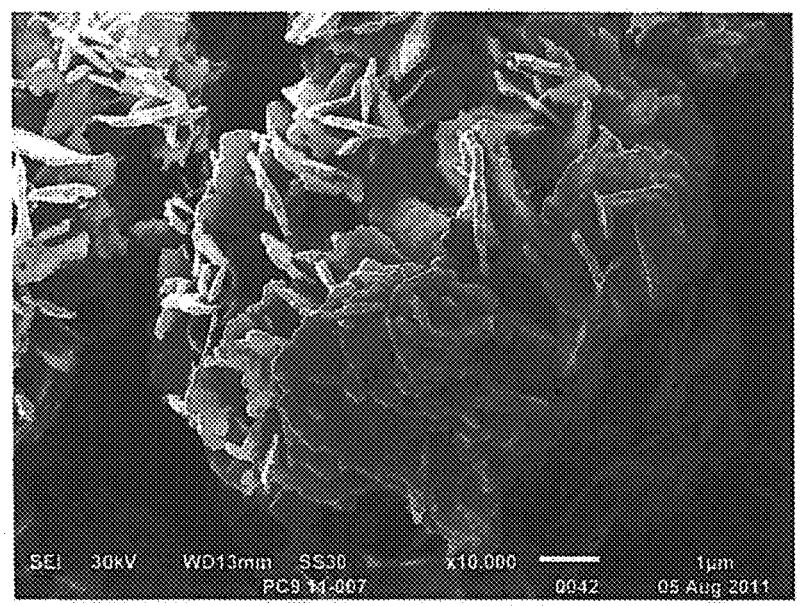

According to thermogravimetric analysis and X-ray diffraction analysis, the product obtained contained 54±2% CaCO$_3$ almost exclusively in calcite form (only traces of aragonite), 41±2% hydromagnesite and no other phase of brucite, periclase, Mg$_3$O$_2$(OH)$_2$ or portlandite type in significant proportion. Its bulk density measured in accordance with standard EN 459.2 was 148 kg/m$^3$. Its specific surface area was 26.3 m$^2$/g (BET method based on manometric nitrogen adsorption) and the <100 μm pore volume measured by mercury intrusion was 3.8 cm$^3$/g. Thermal conductivity was 37 mW/K/m for a density at the time of measurement of 163 kg/m$^3$. See FIGS. 1A and 1B.

Example 2: Carbonation of Semi-Hydrated Dolomite (15% Mg(OH)$_2$, 21% MgO) at 70° C.

This example is comparable with Example 1. The only differences were:
the raw material was replaced by another semi-hydrated dolomite of different composition and origin;
the reactor used for carbonation was a reactor of 3 dm$^3$ volume instead of the 12 dm$^3$ reactor described in Example 1, which implied adaptation of reagent weights and CO$_2$ flow rates.

All the other parameters and all the other steps of the method were similar to those described in Example 1.

A/ Raw Material

The semi-hydrated dolomite used for this example was again prepared industrially from natural dolomite by calcining followed by slaking in a conventional industrial hydrator with low excess water (hydration via dry process). This semi-hydrated dolomite contained 41%±0.5% Ca(OH)$_2$, 15%±0.5% Mg(OH)$_2$ and 21%±0.5% MgO. It also contained 19%±0.5% residual CaCO$_3$, calcination of the dolomite being incomplete, 2%±0.5% residual CaO, hydration of the dolomite being incomplete, and impurities (SiO$_2$, A$_{12}$O$_3$, FeO$_3$ .... The Ca/Mg molar ratio of this dolomite was 1.0.

B/ Preparation of the Milk

This time the milk was prepared by mixing 2 dm$^3$ of demineralized water at 20° C. with 270 g±5 g of semi-hydrated dolomite (i.e. a dry matter content of about 12%). It was then left under agitation and sieved as described in Example 1. After the sieving step the milk which passed through the sieve was added to a reactor of 3 dm$^3$ capacity, also equipped with a double jacket, provided with an agitation system, heating system, pH probe, electrical conductivity probe and temperature probe. As in Example 1 the milk was held under agitation and the temperature brought to 70° C.±2° C.

C/ Carbonation

As in Example 1 carbonation was conducted at 70°±2° C. This time the gas flow rates in the suspension were 0.86 dm³/min for $CO_2$ and 4.90 dm³/min for air. Before carbonation the pH of the milk was 11.4. During carbonation the conversion of the hydroxides to carbonates was accompanied a) by a stepwise reduction in pH and b) by a reduction, by a stabilized phase and finally by an increase in electrical conductivity. The reaction was halted when conductivity started to re-increase after a simultaneous drop in pH to 8.2. The electrical conductivity at the start of carbonation was 8.2 mS/cm, during the stabilized phase it was in the order of 1.0 mS/cm and the reaction was halted at an electrical conductivity of 1.8 mS/cm.

The increase in electrical conductivity at a pH of about 8.6 (or less) indicates the formation of soluble magnesium bicarbonate and the onset of non-desired dissolution of the hydromagnesite.

D/ Post-Synthesis Treatments

After the carbonation step the suspension was filtered and the product dried under the same conditions as those described in Example 1 above, to obtain a dry powder (humidity less than 3%) and a particle size of less than 2 mm.

According to quantitative analysis by X-ray diffraction confirmed by the results of thermogravimetric analysis, the product obtained contained 56±1% $CaCO_3$ of which 41%±1% in calcite form and 15%±1% in aragonite form, 42%±1% hydromagnesite, 0.5±0.5% brucite and 1.1%±0.5% portlandite. Its bulk density was in the order of 188 kg/m³. Its specific surface area was 27.3 m²/g and <100 µm pore volume was 1.2 cm³/g. Thermal conductivity was 38 mW/K/m for a density at the time of measurement of 188 kg/m³.

Figure 2A:
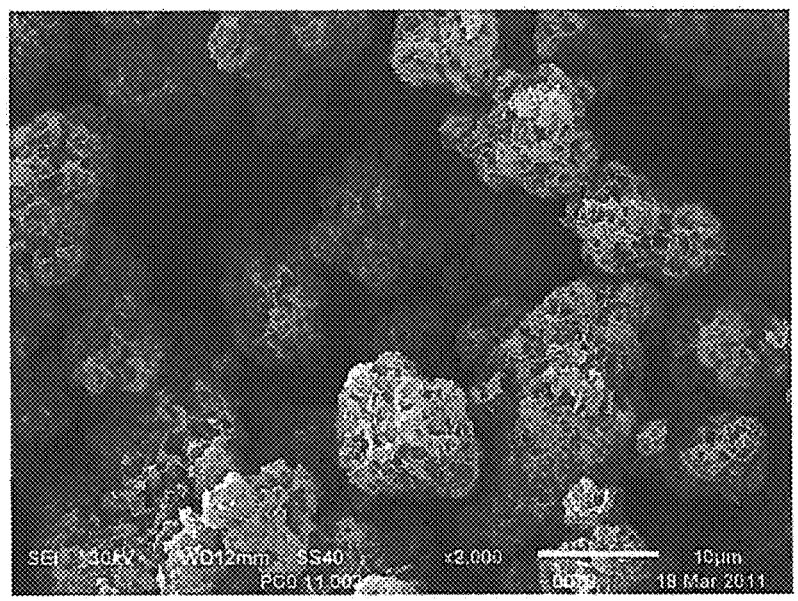
Figure 2B:
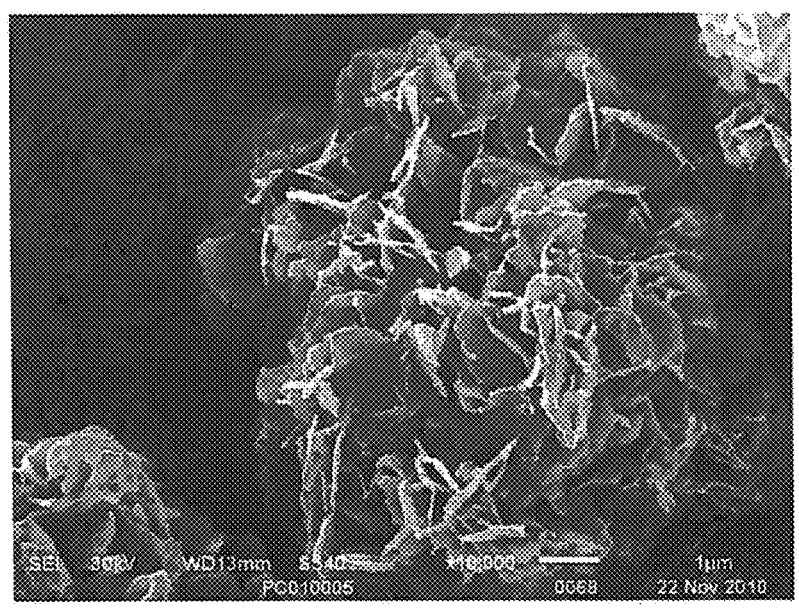

See FIGS. 2A and 2B.

Example 3: Carbonation of Semi-Hydrated Dolomite (31% $Mg(OH)_2$ and 8% MgO) at 70° C.

Example 3 is similar to Example 2, only the raw material used for carbonation was different, the semi-hydrated dolomite in Example 2 being replaced by another semi-hydrated dolomite having different properties.

In this example the semi-hydrated dolomite was no longer an industrial sample. This time it was prepared in the laboratory by hydrating quick dolomite (obtained by industrial calcination of raw dolomite) via wet process with large excess water: 1 mass unit of quick dolomite per 5 mass units of demineralised water at 70° C. were mixed for 10 minutes, and led to the formation of a milk of dolomite. The solid particles contained in this milk were particles of semi-hydrated dolomite containing 55%±0.5% $Ca(OH)_2$, 31%±0.5% $Mg(OH)_2$ and 8%±0.5% MgO. They also contained 3%±0.5% residual $CaCO_3$, the calcination of the dolomite being incomplete, and impurities ($SiO_2$, $Al_2O_3$, $Fe_2O_3$ ... ). The Ca/Mg molar ratio of this dolomite was 1.1.

The milk obtained after a hydration time of 10 minutes was screened through a 250 µm sieve. The milk passing through the sieve was placed in a reactor of 3 dm³ capacity described in Example 2. It was diluted with demineralised water at 20° C. to obtain a milk with dry matter content in the order of 12%. The remainder of the reaction was conducted as described in Example 2. Carbonation was performed at 70° C.±2° C.

The pH of the milk before carbonation was 12.0. Throughout carbonation the conversion of the hydroxides to carbonates was accompanied a) by a stepwise reduction in pH and b) by a reduction, by a stabilized phase and finally by an increase in electrical conductivity. The reaction was halted when the electrical conductivity started to increase simultaneously with a drop in pH to 8.6. The electrical conductivity at the start of carbonation was 7.0 mS/cm, during the stabilized phase it was in the order of 0.5 mS/cm and the reaction was halted when electrical conductivity reached 1.4 mS/cm.

According to quantitative analysis by X-ray diffraction confirmed by the results of thermogravimetric analysis, the product obtained after the steps of filtering, drying and grinding such as described in Example 1 was in the form of a dry powder containing 53±2% $CaCO_3$, almost exclusively in calcite form (only traces of aragonite), 45±2% hydromagnesite, 2.0±1% portlandite. Its bulk density was 181 kg/m³. Its specific surface area was 28.9 m²/g and the <100 µm pore volume was 2.5 cm³/g. Thermal conductivity was 39 mW/K/m for a density at the time of measurement of 187 kg/m³.

Figure 3A:
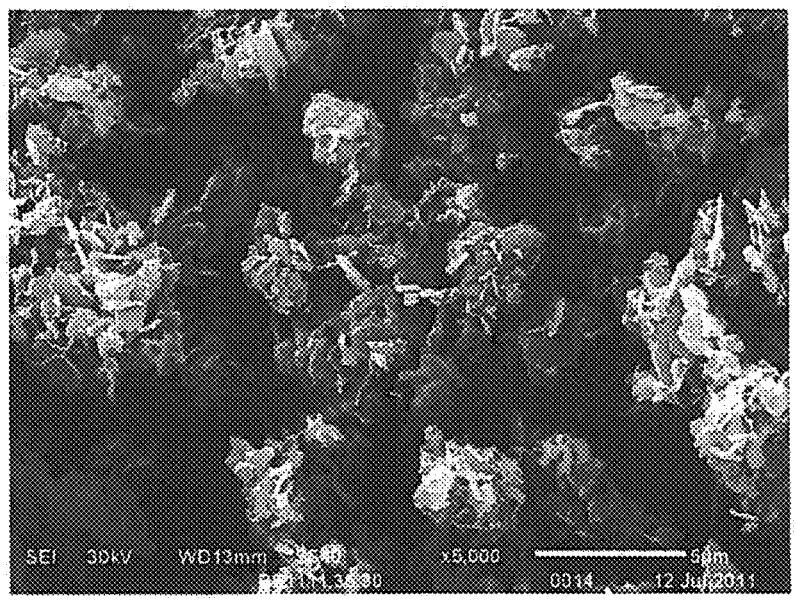
Figure 3B:
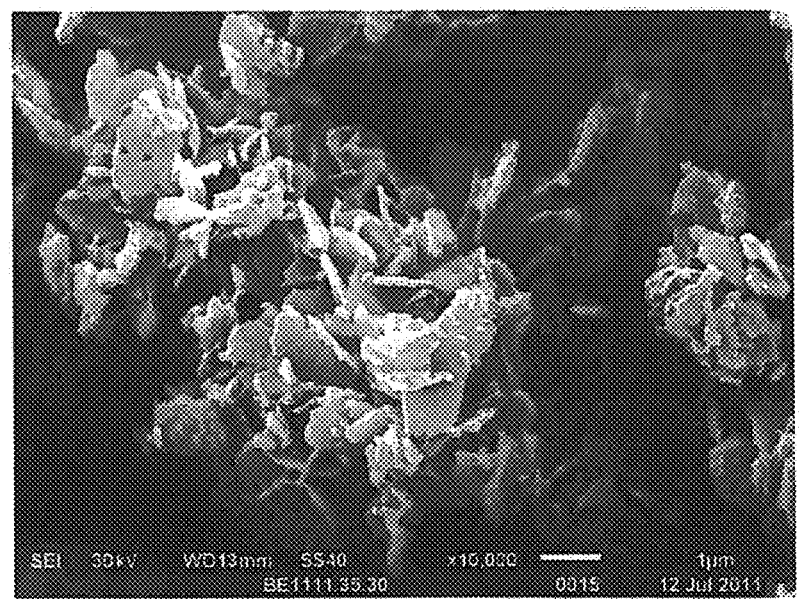

See FIGS. 3A and 3B.

Example 4: Carbonation of Fully Hydrated Dolomite (39% $Mg(OH)_2$ and Less Than 1% MgO) at 70° C.

Example 4 is similar to Example 2, only the raw material used for carbonation was different, the semi-hydrated dolomite being replaced by fully hydrated dolomite.

Fully hydrated dolomite is an industrial product obtained by calcining raw dolomite followed by hydration under pressure. The fully hydrated dolomite used in this example contained 54%±0.5% $Ca(OH)_2$, 39%±0.5% $Mg(OH)_2$ and less than 1%±0.5% residual MgO. It also contained 5%±0.5% residual $CaCO_3$ and less than 1% of impurities ($SiO_2$, $Al_2O_3$, $Fe_2O_3$ ... ). The Ca/Mg molar ratio of this dolomite was 1.1.

The pH of the milk prepared in accordance with the indications given in Example 2 was 12.2 before carbonation. Carbonation was conducted at 70° C. Throughout carbonation the conversion of the hydroxides to carbonates was accompanied a) by a stepwise reduction in pH and b) by a reduction, by a stabilized phase and finally by an increase in electrical conductivity. The reaction was halted when the electrical conductivity started to increase simultaneously with a drop in pH to 8.8. Electrical conductivity at the start of carbonation was 9.6 mS/cm, during the stabilized phase it was in the order of 1.4 mS/cm and the reaction was halted when the electrical conductivity reached 2.0 mS/cm.

According to quantitative analysis by X-ray diffraction confirmed by the results of thermogravimetric analysis the product obtained after the steps of filtering, drying and grinding such as described in Example 1, was in the form of a dry powder containing 54±1% $CaCO_3$ almost exclusively in calcite form (only traces of aragonite), 40±1% hydromagnesite, 5±1% brucite and 1.0±0.5% portlandite. It bulk density was 161 kg/m³. It specific surface area was 27.3 m²/g and the <100 µm pore volume was 3.7 cm³/g. Thermal conductivity was 36 mW/K/m for a density at the time of measurement of 151 kg/m³.

Figure 4A:
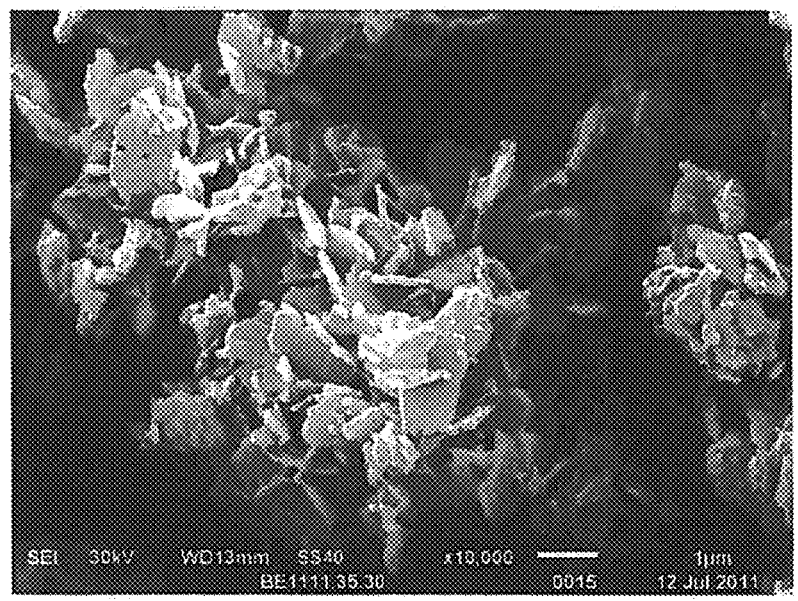
Figure 4B:
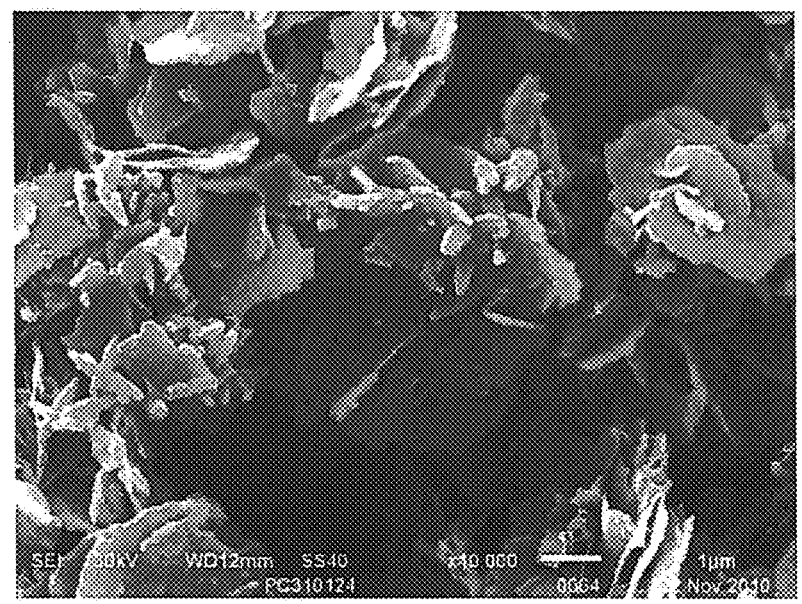

See FIGS. 4A and 4B.

Example 5: Carbonation of Fully Hydrated Dolomite (39% $Mg(OH)_2$ and Less than 1% MgO) with Addition of MgO at 70° C.

Example 5 is similar to Example 4, the raw material and the method being identical to those described in Example 4.

The only difference compared with Example 4 is that this time a small quantity of MgO was added to the milk of fully hydrated dolomite before injecting $CO_2$. The proportion of MgO corresponded to 3% of the weight of the hydrated dolomite. The MgO was obtained by calcining a commercial powder $Mg(OH)_2$ for 2 h at 400° C.

According to quantitative analysis by X-ray diffraction confirmed by the results of thermogravimetric analysis, the product obtained after the steps of filtering, drying and grinding such as described in Example 1, was in dry powder form containing 54±2% $CaCO_3$, almost exclusively in calcite form (only traces of aragonite) 46±2% hydromagnesite and no other phase in significant proportion. Its specific surface area was 25.4 $m^2/g$ and the <100 μm pore volume was 2.6 $cm^3/g$. Thermal conductivity was 36 mW/K/m for a density at the time of measurement of 156 $kg/m^3$.

Figure 5A:
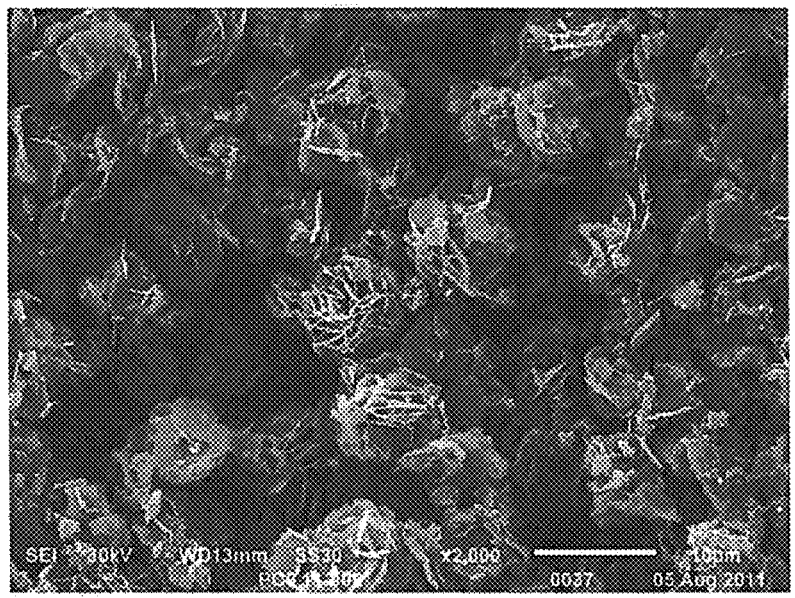
Figure 5B:
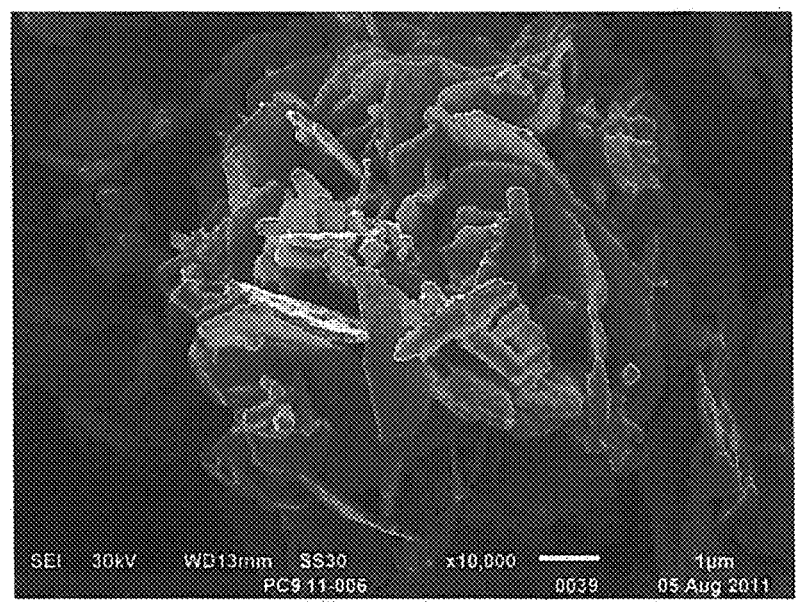

See FIGS. 5A and 5B.

Example 6: Carbonation of Semi-Hydrated Dolomite (15% $Mg(OH)_2$, 21% MgO) at Lower Temperature (60° C.)

A/ Raw Material

The semi-hydrated dolomite used in this example was the same as used in Example 2 (Ca/Mg molar ratio=1.0).

B/ Preparation of the Milk

Milk of dolomite was prepared by mixing 10.2 $dm^3$ demineralized water at 20° C. with 770 g±5 g of semi-hydrated dolomite (i.e. a dry matter content of 7%). This milk was left under agitation for about ten minutes then ground and de-agglomerated using an agitator of Ultra Turrax type (IKA trade name) for 30 seconds to reduce the size of the agglomerates in suspension to below 90 μm. The milk thus prepared was added to a reactor of 12 $dm^3$ capacity described in Example 1. The milk was held under agitation and the temperature brought to 60° C.±2° C.

C/ Carbonation

When the milk reached the temperature of 60° C.±2° C., the injection of $CO_2$ was initiated in the form of a gas composed of 20% by volume $CO_2$ and 80% by volume of air. The $CO_2$ carrier gas was injected via a nozzle at the bottom of the reactor. The gas flow rates in the suspension corresponded to 3.0 $dm^3$/min for $CO_2$ and 12.0 $dm^3$/min for air per kg of starting semi-hydrated dolomite. The pH of the milk before carbonation was 12.1. During carbonation the conversion of the hydroxides to carbonates was accompanied a) by a stepwise reduction in pH and b) by a reduction, by a stabilized phase and finally by an increase in electrical conductivity. The reaction was halted when the electrical conductivity started to increase simultaneously with a drop in pH to 8.5. The electrical conductivity at the start of carbonation was 10.1 mS/cm, during the stabilized phase it was in the order of 3.9 mS/cm and the reaction was halted at an electrical conductivity of 4.5 mS/cm.

D/ Post-Synthesis Treatments

The post-synthesis treatments conducted for this sample were similar to those performed in Examples 1 to 5 and allowed a dry powder to be obtained.

According to quantitative analysis by X-ray diffraction the product thus obtained contained 58±1% $CaCO_3$, of which 43±1% in calcite form and 16±1% in aragonite form, 38±1% hydromagnesite, 2±1% brucite, 1±0.5% portlandite and 0.5±0.5% $Mg_3O_2(OH)_2$. Its bulk density was 146 $kg/m^3$. Its specific surface area was 25.0 $m^2/g$. Thermal conductivity was 39 mW/K/m for a density at the time of measurement of 189 $kg/m^3$.

Figure 6A:
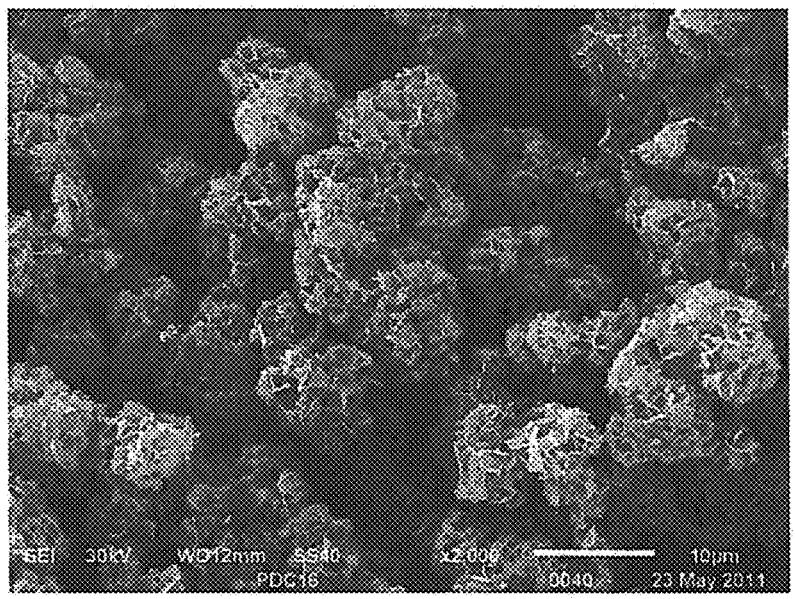
Figure 6B:
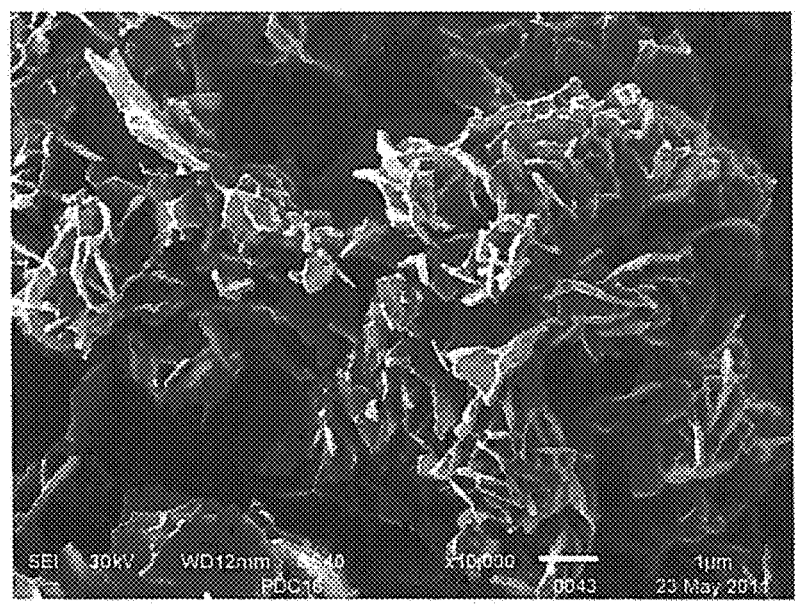

See FIGS. 6A and 6B.

Example 7: Carbonation of Semi-Hydrated Dolomite (15% $Mg(OH)_2$), 21% MgO) with the Addition of $Mg(OH)_2$ at 75° C.±2° C.

This example is fully similar to Example 6 with the exception this time that the 770 g of semi-hydrated dolomite used to prepare the milk of dolomite were replaced by a mixture of 534 g of this same semi-hydrated dolomite and 236 g of commercial $Mg(OH)_2$ in a 50% aqueous suspension, to obtain the same total solid content as in Example 6. This led to a Ca/Mg molar ratio of 0.5 in the solid phase of the suspension.

Also, contrary to Example 6, the carbonation reaction here was performed at 75° C.±2° C. The pH of the suspension before carbonation was 11.8.

As in Example 6, the 12 $dm^3$ reactor was used. When the suspension reached a temperature of 75° C.±2° C., the injection of a gas containing 20% by volume of $CO_2$ and the remainder being air was initiated. The gas flow rates in the suspension were 2.6 $dm^3$/min for $CO_2$ and 10.4 $dm^3$/min for air per kilogram of solid matter in suspension (dolomite and $Mg(OH)_2$).

During carbonation, the conversion of the hydroxides to carbonates was accompanied a) by a stepwise reduction in pH and b) by a reduction, by a stabilization phase and finally by an increase in electrical conductivity. At the start of carbonation electrical conductivity was 10.0 mS/cm, during the stabilization phase it was in the order of 2.3 mS/cm and the reaction was halted at a conductivity of 2.9 mS/cm.

According to quantitative analysis by X-ray diffraction, the product obtained after the steps of filtering, drying and grinding such as described in Example 1, was in the form of a dry powder containing 39±1% $CaCO_3$ of which 35±1% in calcite form, and 4±1% in aragonite form, 26±2% hydromagnesite, 33±2% brucite, 1±0.5% portlandite and 1.0±0.5% periclase. It had a bulk density of 132 $kg/m^3$. Its specific surface area was 18 $m^3/g$. Thermal conductivity was 37 mW/K/m for a density at the time of measurement of 154 $kg/m^3$.

Figure 7A:
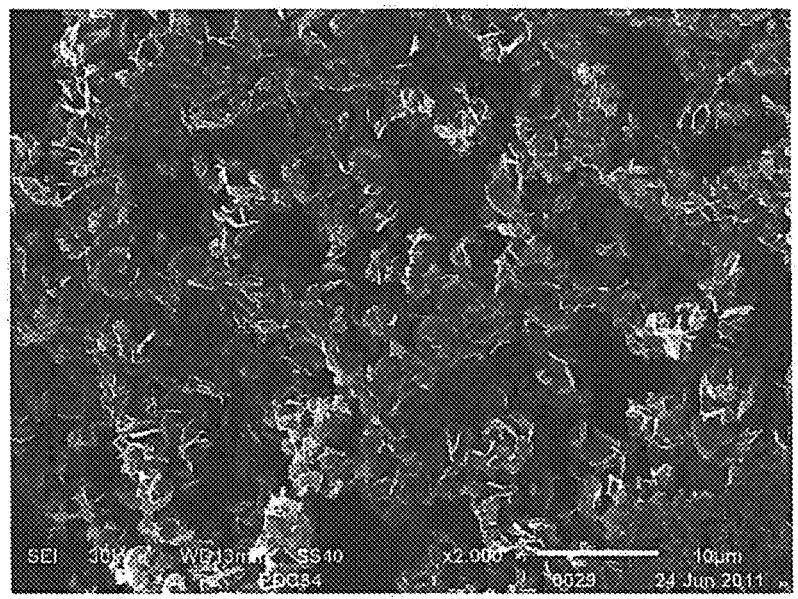
Figure 7B:
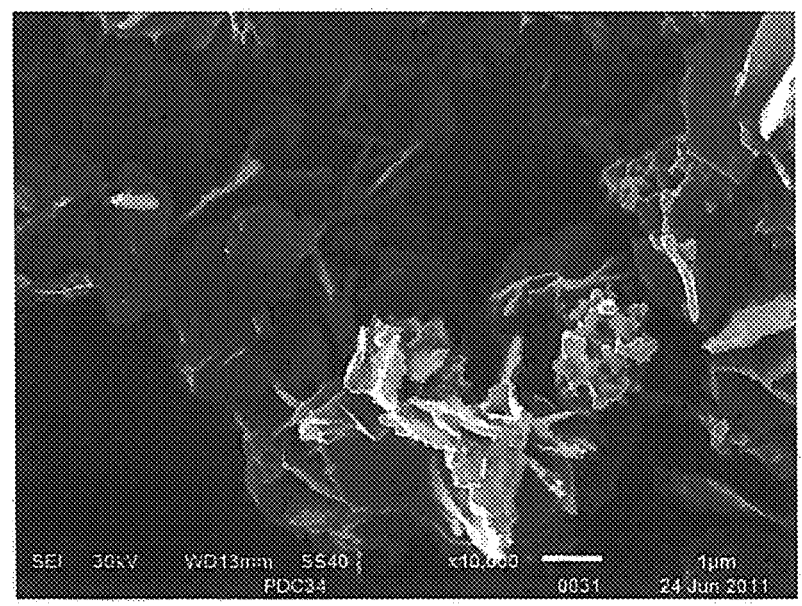

See FIGS. 7A and 7B.

Example 8: Carbonation at 70° C.±2° C. of a Calcined Dolomitic Product

This example is comparable with Example 3. Only the raw material differs and a few details of method.

In this example, a product naturally composed of dolomite ($CaCO_3MgCO_3$), limestone ($CaCO_3$) and brucite ($Mg(OH)_2$), having a Ca/Mg molar ratio of 1.0 was calcined in a laboratory furnace at 980° C. to obtain a mixed oxide containing CaO and MgO and small quantities of residual $CaCO_3$. This oxide was then hydrated via wet process in a laboratory with large excess water: 1 mass unit of oxide and 7 mass units of demineralized water at 20° C. were mixed for 30 minutes leading to the formation of milk, the solid particles contained in this milk being similar to particles of semi-hydrated dolomite.

Contrary to Example 3 the milk was not screened. Since its dry matter content was already in the order of 12% it was not diluted either. Carbonation could be conducted directly in the 3 $dm^3$ reactor under the conditions described in Example 3.

The pH of the milk was 12.6 before carbonation. Carbonation was performed at 70° C.±2° C. During carbonation the conversion of the hydroxides to carbonates was accompanied a) by a stepwise reduction in pH and b) by a reduction, by a stabilized phase and finally by an increase in electrical conductivity. The reaction was halted when electrical conductivity started to increase simultaneously with a drop in pH to 8.5. The electrical conductivity at the start of carbonation was 8.0 mS/cm, during the stabilized phase it was in the order of 1.2 mS/cm and the reaction was halted when electrical conductivity reached 2.3 mS/cm.

The product obtained after the steps of filtering, drying and grinding such as described in Example 1 was in the form of a dry powder. Its bulk density was 157 kg/m$^3$. Its specific surface area was 19.6 m$^2$/g and the <100 μm pore volume was 3.5 cm$^3$/g. Thermal conductivity was 36 mW/K/m for a density at the time of measurement of 168 kg/m$^3$.

Figure 8A:
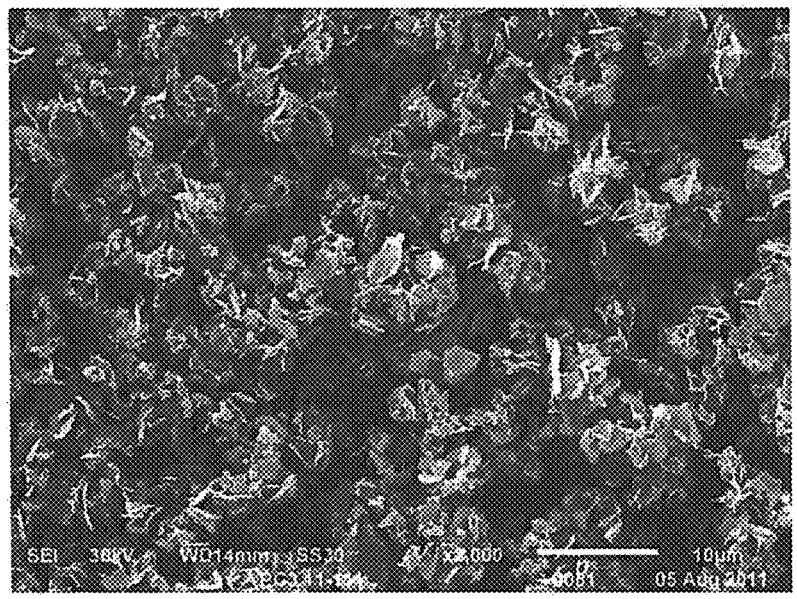
Figure 8B:
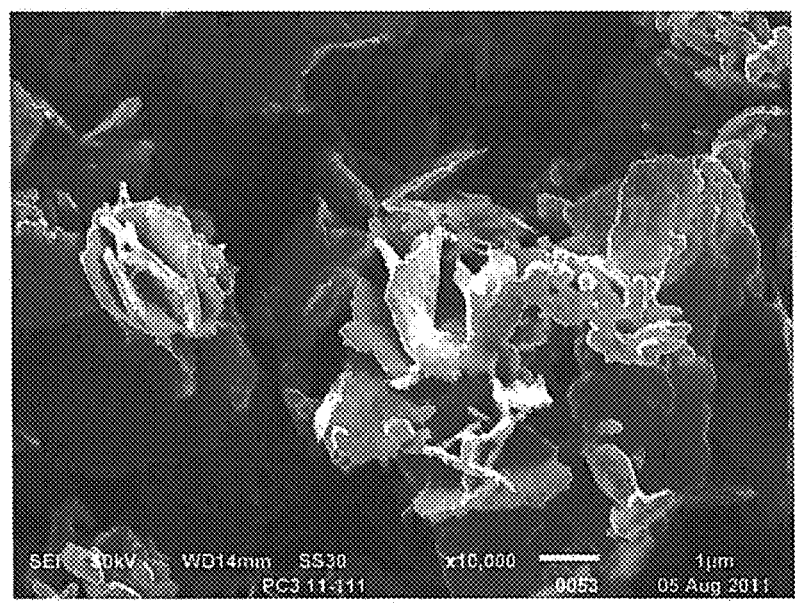

See FIGS. 8A and 8B.

Example 9: Carbonation at 70° C.±2° C. Of Semi-Hydrated Dolomite (15% Mg(OH)$_2$ and 21% MgO on Pilot Scale Example 9 is similar to Example 2 but the reaction was performed in a 100 dm$^3$ reactor instead of the 3 dm$^3$ reactor used in Example 2. This time the milk was prepared by mixing 80 dm$^3$ of demineralized water at 20° C. with 9.6 kg of the semi-hydrated dolomite described in Example 2 (i.e. a dry matter content in the milk of 10.7%). The remainder of the synthesis method described in Example 2 was unchanged. Only the CO$_2$ flow rates were adapted to obtain carbonation of the 9.6 kg of semi-hydrated dolomite within a time close to the time for carbonation of the 240 g of semi-hydrated dolomite in the 3 dm$^3$ reactor in Example 2, i.e. about 3 hours; 33 dm$^3$/min CO$_2$ and 314 dm$^3$/min of air per kg of starting semi-hydrated dolomite.

The product obtained after the steps of filtering, drying and grinding such as described in Example 1 was in the form of a dry powder. According to quantitative analysis by X-ray diffraction confirmed by thermogravimetric analysis, this product contained 57±1% CaCO$_3$ of which 52±1% in calcite form and 5±1% in aragonite form, 42±1% hydromagnesite and 1±0.5% portlandite. Its bulk density was 188 kg/m$^3$. Its specific surface area was 25.6 m$^2$/g and the <100 μm pore volume was 1.2 cm$^3$/g. Thermal conductivity was 39 mW/K/m for a density at the time of measurement of 220 kg/m$^3$.

Figure 9A:
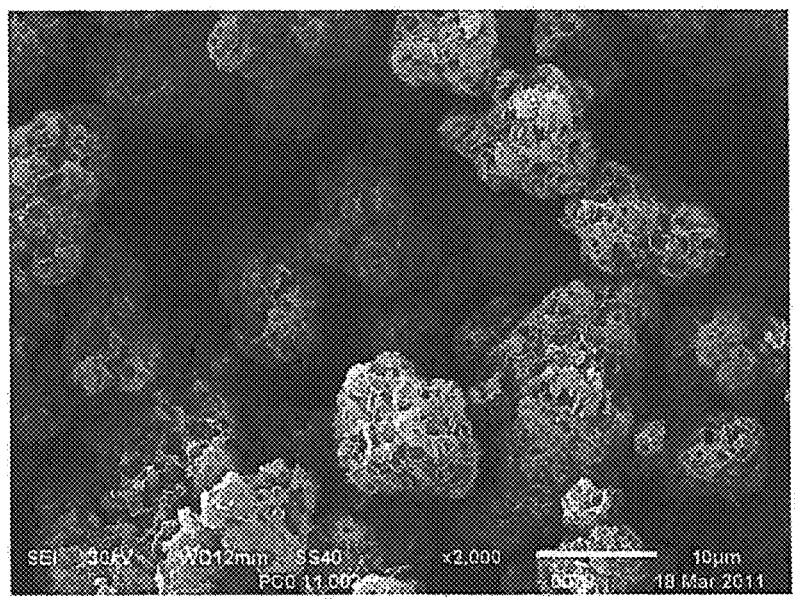
Figure 9B:
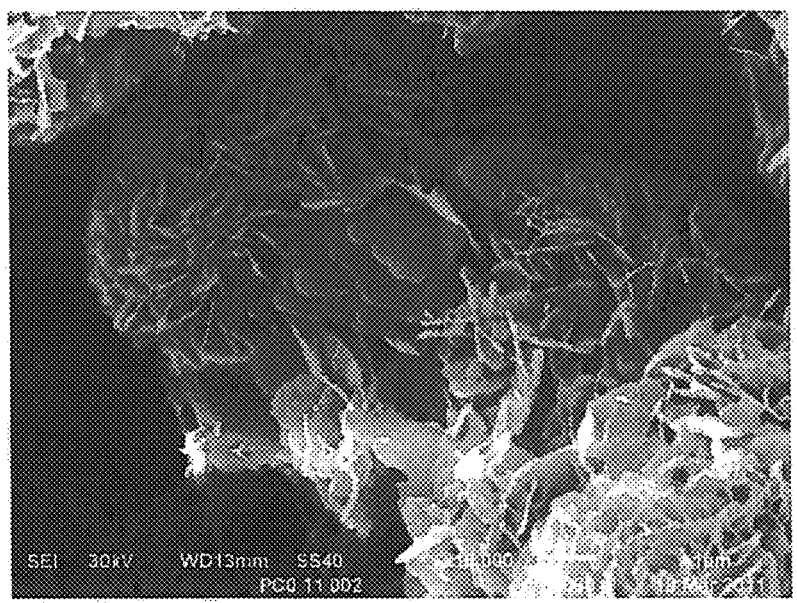

See FIGS. 9A and 9B.

Example 10: Carbonation of Semi-Hydrated Dolomite and Grinding of the Carbonate Example 10 is similar to Example 2 except that after the drying step the product was ground to reach a particle size no longer of <2 mm but of <80 μm.

The mineralogical composition of this powder was similar to that of the 2 mm powder obtained in Example 2, as was the specific surface area. On the other hand, grinding allowed an increase in the volume of <100 μm pores from 1.2 to 2.6 cm$^3$/g and the pore size distribution was distinctly modified, the pores being wider after grinding. The bulk density of the product was clearly reduced in comparison with the 2 mm powder as was thermal conductivity: bulk density of 118 kg/m$^3$ and conductivity of 32 mW/K/m for a density of 148 kg/m$^3$ at the time of measurement.

Figure 10A:
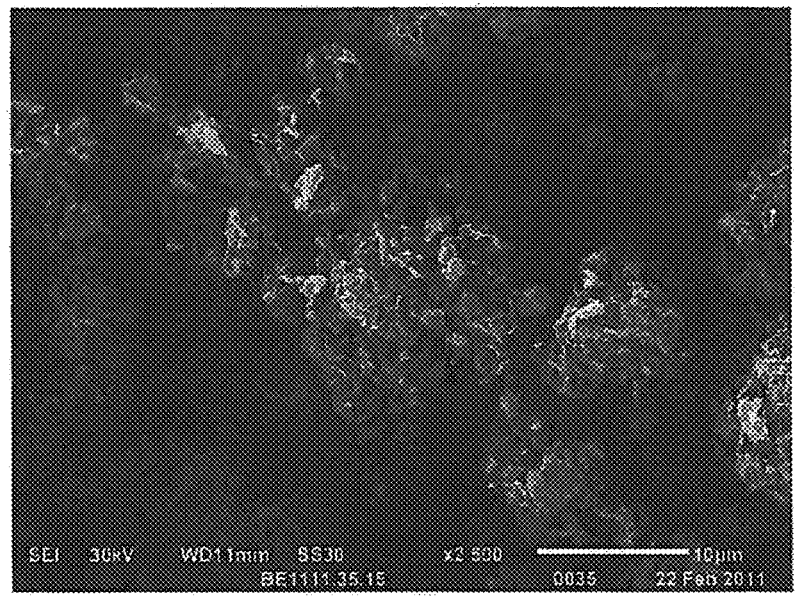
Figure 10B:
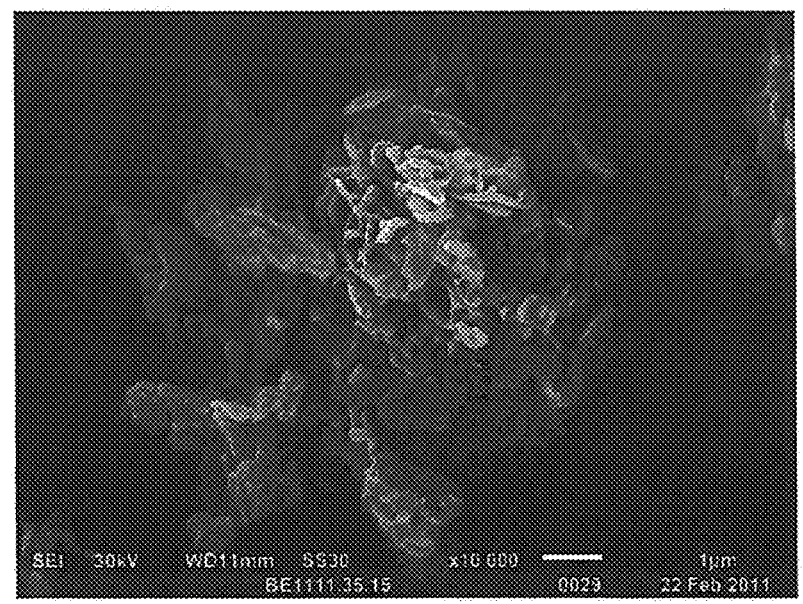

See FIGS. 10A and 10B.

Example 11

For optimisation of the product and of the method subject of the present invention, an experimental plan was determined. This experimental plan concerned optimising the carbonation step of an aqueous suspension in a reactor of 100 dm$^3$ capacity, a reactor which had already been used in Example 9. Four parameters were examined: i) volume proportion of CO$_2$ in the gaseous phase (13.9 to 46.1%), ii) flow rate of CO$_2$ relative to the weight of the at least partially hydrated dolomite for carbonation (3.8 to 12.9 dm$^3$/min/kg of dolomite), iii) dry extract of the milk of dolomite before carbonation (5.2 to 14.8%) and iv) carbonation temperature (57 to 73° C.). For all the experiments, a hydration step of quick dolomite of particle size less than 3 mm was initially performed in a 40 dm$^3$ reactor under the following conditions: initial temperature of the hydrating water set at 54° C., water/dolomite weight ratio 3.2 (i.e. an initial dry extract of 23.8%) and agitation speed of 275 rpm. Hydrating time was 30 to 40 minutes.

After hydration the milk of dolomite obtained was screened through a 200 μm sieve. The milk passing through the 200 μm mesh was diluted with water to adjust the dry extract of the milk of the at least partially hydrated dolomite to the desired value and to obtain a total milk of dolomite volume of 80 dm$^3$. These 80 cm$^3$ of diluted milk were placed in the 100 dm$^3$ carbonation reactor. The temperature of the milk was brought to the desired temperature for carbonation by circulating, a liquid of controlled temperature in the double jacket of the 100 dm$^3$ reactor. This temperature was held constant throughout the entire duration of carbonation ±2° C. When the temperature of the milk of dolomite was stabilized, the injection was initiated of the gaseous phase (air+CO$_2$). The flow rate regulators of CO$_2$ and air were previously adjusted to obtain the desired conditions of CO$_2$ flow rate in relation to the weight of the at least partly hydrated dolomite to be carbonated, and to obtain the desired CO$_2$ volume proportion in the gaseous phase. During carbonation the pH of the suspension and its electrical conductivity were recorded. A stepwise reduction in pH down to a value lower than 9 with, in parallel and successively, a decrease in electrical conductivity, a stabilization phase such as defined above and finally an increase in electrical conductivity of the suspension were observed. Carbonation was halted when electrical conductivity started to increase at the end of the stabilization phase.

On completion of the carbonation reaction, the suspension was recovered and the size of the particles in the suspension was initially measured by laser particle size measurement placing a few drops of suspension in methanol ($d_{10}$, $d_{50}$, $d_{90}$ in the Table below). Part of the suspension was then filtered through Büchner apparatus, dried in an oven at 70° C. for 2 to 3 days before being finally ground to a size smaller than 2 mm (100% passed through a sieve mesh size of 2 mm). On this ground product the bulk density was measured following the method described in EN 459.2, as well as the thermal conductivity, the BET specific surface area and the proportion of hydromagnesite according to thermogravimetric results (temperature ramp from ambient temperature up to 950° at a rate of 5° C./min under nitrogen). Some results corresponding to the extreme operating conditions of this experimental plan are given in the Table below.

Two further carbonation tests were performed under fully comparable conditions but by adjusting the carbonation conditions to the optimal conditions determined in the experimental plan. The operating conditions and results of these two tests are given in the two last lines of the Table below and show that the conditions determined by the experimental plan are indeed the best since they allowed the synthesis of products of lower bulk density and lower thermal conductivity.

In general, in particular on the basis of the results given in this Table, a relationship was observed between the size of the particles in suspension measured by laser particle size measurement and thermal conductivity measured on the powder produced from the said suspension. Overall, thermal conductivity tends to be lower the coarser the particles in suspension.

| Operating conditions | | | | Results | | | | | | |
|---|---|---|---|---|---|---|---|---|---|---|
| $CO_2$ concentration in gas phase (vol. %) | $CO_2$ flow rate (dm³/min/kg dolomite) | Dry extract of suspension before carbonation (wt. %) | Temperature (° C.) | % Hydromagnesite | Bulk density (kg/m³) | Specific surface area (m²/g) | d10 (μm) | d50 (μm) | d90 (μm) | Thermal conductivity (mW/K/m) |
| Experimental plan extremes | | | | | | | | | | |
| 13.9 | 6.5 | 10 | 65 | 45.4 | 180.4 | 26.1 | 2.9 | 7.3 | 12.3 | 39.1 |
| 46.1 | 6.5 | 10 | 65 | 46.1 | 112.3 | 25.5 | 4.4 | 12.1 | 21.8 | 35.6 |
| 40 | 3.8 | 13 | 60 | 35.6 | 135.3 | 25.6 | 4.0 | 9.6 | 17.0 | 36.6 |
| 30 | 12.9 | 5.2 | 65 | 42.7 | 193.4 | 20.4 | 3.9 | 11.8 | 21.4 | 38.6 |
| 30 | 4.3 | 14.8 | 65 | 40.6 | 159.8 | 28.2 | 3.2 | 7.2 | 11.9 | 38.9 |
| 30 | 6.5 | 10 | 57 | 46.9 | 126.6 | 26.8 | 4.1 | 10.3 | 19.6 | 35.7 |
| 30 | 6.5 | 10 | 73 | 43.7 | 121.7 | 24.1 | 4.5 | 11.2 | 20.5 | 36.0 |
| New syntheses as per conditions optimised by the experimental plan | | | | | | | | | | |
| 40 | 5.9 | 8.1 | 55 | 45.6 | 117.6 | 22.4 | 6.3 | 25.5 | 88.2 | 34.8 |
| 20 | 6.9 | 7.8 | 60 | 43.5 | 97.0 | 23.5 | 7.0 | 26.9 | 60.2 | 33.5 |

The invention is not to be construed in any manner as being limited to these examples, and numerous modifications can be made thereto without departing from the scope of the appended claims.

The invention claimed is:

1. A mineral composition containing a mixed solid phase of synthetic calcium and magnesium carbonates, formed of a crystallised calcic portion comprising at least one carbonate selected from the group consisting of calcite and mixtures of calcite and aragonite and a crystallised magnesium portion comprising hydromagnesite in plate-like form, wherein a crystals of the calcic portion and a crystals of the magnesium portion being aggregated in the form of composite aggregates which are formed of a calcic core on which plates of hydromagnesite are aggregated, these composite aggregates being at least partly agglomerated in the form of agglomerates, wherein the mixed solid phase of carbonates of the mineral composition having a thermal conductivity of 25 to 40 mW/K/m and a bulk density equal to or lower than 250 kg/m³ and equal to or higher than 80 kg/m³ measured according to standard EN 459.2 and a Ca/Mg molar ratio of between 0.4 and 1.2.

2. The mineral composition according to claim 1, wherein the crystallised magnesium portion further comprises one or more magnesium compounds selected from the group consisting of periclase, magnesium oxyhydroxide and brucite.

3. The mineral composition of claim 1, wherein the calcic portion further comprises calcium hydroxide.

4. The mineral composition of claim 1, wherein the mixed solid phase of said mineral composition has a specific surface area, measured by manometric nitrogen adsorption and calculated using the BET method, of 15 m²/g or higher.

5. The mineral composition of claim 1, further comprising an aqueous phase, wherein the mineral composition is in the form of a suspension or paste.

6. The mineral composition of claim 1, wherein the mineral composition is in solid form, particularly in powder form, and has a humidity content of between 0 and 4% by weight of water relative to the total weight of the composition.

7. The mineral composition of claim 1, wherein the hydromagnesite is represented by the formula $Mg_5(CO_3)_4(OH)_2 \cdot 4H_2O$ and the content thereof is A between 10 and 60% by weight relative to the weight of the mixed solid phase.

8. The mineral composition of claim 1, wherein the calcic portion is contained in an amount ranging from 35 to 75% by weight relative to the total weight of the mixed solid phase, and wherein the magnesium portion is contained in an amount ranging from 25 to 65% by weight relative to the total weight of the mixed solid phase.

9. The mineral composition of claim 1, wherein the mixed solid phase is contained in a proportion ranging from 5 to 65% by weight relative to the total weight of the composition and wherein a liquid medium is contained in a proportion ranging from 35 to 95% by weight relative to the total weight of the mineral composition.

10. The mineral composition of claim 1, wherein the bulk density of the mixed solid phase is equal to or lower than 200 kg/m or equal to or higher than 100 kg/m³.

11. The mineral composition of claim 1, wherein the mixed solid phase is composed of agglomerates ground to a particle size of 2 mm or smaller.

12. A method for manufacturing a mineral composition based on a mixed solid phase of synthetic calcium and magnesium carbonates according to claim 1, comprising:
   i) preparing at least partly hydrated dolomite by calcining raw dolomite followed by at least partial hydration of the calcined dolomite;
   ii) placing the at least partly hydrated dolomite in suspension in an aqueous phase, the suspension having a proportion of between 5 and 15% by weight of solid matter relative to the total weight of the suspension;
   iii) carbonation of the hydrated dolomite in suspension by injecting a $CO_2$ containing gas into the suspension heated to a temperature of 55 to 90° C., at a $CO_2$ flow rate of 2.5 to 15 dm3/min/kg of the solid matter in suspension, with a stepwise reduction in pH of the suspension down to a value below 9 and in parallel and successively a reduction in the electrical conductivity of the suspension, then stabilization thereof and finally an increase in the stabilised electrical conductivity, carbonation being halted as soon as the increase in electrical conductivity is observed.

13. The method according to claim 12, characterized in that the raw dolomite before calcining is contained in a dolomitic mineral product in association with one or more calcic substances, one or more magnesium substances or a mixture of these substances forming a Ca/Mg molar ratio of between 0.8 and 1.2, in the dolomitic mineral product, and in that the solid matter of the suspension obtained after the steps of calcining, hydrating and placing in suspension, in addition to particles of at least partly hydrated dolomite, contains particles related thereto derived from the associated substances in the dolomitic mineral product.

14. The method according to claim 12, characterized in that the calcining of the raw dolomite is partial and in that the solid matter in suspension contains a fraction of $CaCO_3$.

15. The method according to claim 12, further comprising a step of adding MgO and/or $Mg(OH)_2$ to the at least partly hydrated dolomite to obtain a mixed solid phase having a Ca/Mg molar ratio of between 0.4 and 1.2.

16. The method according to claim 12, characterized in that the hydration of the calcined dolomite and the placing in suspension in an aqueous phase of the hydrated dolomite are performed in a single step by slaking the calcined dolomite with excess water.

17. The method according to claim 12, wherein the said mixed solid phase is ground to obtain particles of size equal to or less than 2 mm.

18. The method according to claim 12, wherein the carbonation temperature is between 60 and 80° C.

19. The method according to claim 12, characterized in that the gas injected into the suspension containing $CO_2$ at a concentration of 10 to 100% by volume.

20. The method according to claim 12, further comprising sieving to a particle A size of 250 μm or less, or grinding to a particle size of 90 μm or less of the solid matter of the suspension intended for carbonation.

* * * * *